US006136446A

United States Patent [19]

Virnelson et al.

[11] Patent Number: 6,136,446

[45] **Date of Patent: *Oct. 24, 2000**

[54] DESICCANT MATRIX FOR AN INSULATING GLASS UNIT

[75] Inventors: Bruce Virnelson, Valencia; Jin Song, Stevenson Ranch, both of Calif.

[73] Assignee: PRC-DeSoto International, Inc., Burbank, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/444,964

[22] Filed: May 19, 1995

[51] Int. Cl.[7] .............................. B32B 27/40; C08K 3/34; C08L 75/04

[52] U.S. Cl. .................. 428/425.6; 428/34.7; 428/411.1; 428/426; 524/296; 524/450; 524/199; 524/200; 524/261; 524/265

[58] Field of Search .............................. 428/425.6, 411.1, 428/34, 426, 34.7; 524/296, 450, 199, 200, 261, 265

[56] References Cited

U.S. PATENT DOCUMENTS

| | | | |
|---|---|---|---|
| 3,758,996 | 9/1973 | Bowser | 55/385.1 |
| 3,791,910 | 2/1974 | Bowser | 161/45 |
| 3,919,023 | 11/1975 | Bowser et al. | 156/107 |
| 4,032,500 | 6/1977 | Koch et al. | 260/33.6 |
| 4,042,736 | 8/1977 | Flint | 428/34 |
| 4,120,999 | 10/1978 | Chenel et al. | 428/34 |
| 4,153,594 | 5/1979 | Wilson, Jr. | 524/59 |
| 4,215,164 | 7/1980 | Bowser | 428/34 |
| 4,425,389 | 1/1984 | Schöllhorn et al. | 428/34 |
| 4,431,691 | 2/1984 | Greenlee | 428/34 |
| 4,476,169 | 10/1984 | Nishino et al. | 428/34 |
| 4,530,195 | 7/1985 | Leopold | 52/717.02 |
| 4,587,289 | 5/1986 | Comert et al. | 524/505 |
| 4,622,249 | 11/1986 | Bowser | 428/34 |
| 4,669,241 | 6/1987 | Kelly | 52/204.597 |
| 4,775,719 | 10/1988 | Markevka et al. | 525/125 |
| 4,808,255 | 2/1989 | Markevka et al. | 156/307.3 |
| 4,820,368 | 4/1989 | Markevka et al. | 156/307.3 |
| 4,835,130 | 5/1989 | Box | 502/62 |
| 4,891,269 | 1/1990 | Markevka et al. | 428/423 |
| 4,950,344 | 8/1990 | Glover et al. | 156/109 |
| 4,965,117 | 10/1990 | Lautenschlaeger et al. | 428/182 |
| 4,985,535 | 1/1991 | Takada et al. | 528/272 |
| 4,994,309 | 2/1991 | Reichert et al. | 428/34 |
| 5,017,653 | 5/1991 | Johnston | 525/89 |
| 5,019,638 | 5/1991 | Müller et al. | 528/83 |
| 5,061,749 | 10/1991 | Ito et al. | 524/850 |
| 5,075,407 | 12/1991 | Cody et al. | 528/71 |
| 5,091,444 | 2/1992 | Bauer et al. | 523/209 |
| 5,106,663 | 4/1992 | Box | 428/34 |
| 5,120,379 | 6/1992 | Noda et al. | 156/107 |
| 5,177,916 | 1/1993 | Misera et al. | 52/172 |
| 5,189,096 | 2/1993 | Boutillier et al. | 525/56 |
| 5,234,730 | 8/1993 | Lautenschlaeger et al. | 428/34 |
| 5,286,787 | 2/1994 | Podola et al. | 524/773 |
| 5,304,623 | 4/1994 | Ito et al. | 528/28 |
| 5,324,778 | 6/1994 | Boutillier et al. | 525/56 |
| 5,340,887 | 8/1994 | Vincent et al. | 525/477 |
| 5,342,873 | 8/1994 | Merz et al. | 524/425 |
| 5,385,986 | 1/1995 | Frihart et al. | 525/420.5 |
| 5,494,957 | 2/1996 | Moore et al. | 524/504 |
| 5,641,575 | 6/1997 | Farbstein | 428/423.1 |

FOREIGN PATENT DOCUMENTS

| | | |
|---|---|---|
| 1181519 | 2/1970 | United Kingdom . |

*Primary Examiner*—Terrel Morris
*Assistant Examiner*—John J. Guarriello
*Attorney, Agent, or Firm*—Gifford, Krass, Groh, Sprinkle, Anderson & Citkowski, P.C.

[57] ABSTRACT

This invention relates generally to spacer assemblies for insulating glass units. More specifically, this invention relates to a single component desiccant matrix which can be applied to the interior of a spacer assembly at room temperature. Upon exposure to the ambient atmosphere, the desiccant matrix irreversibly cures.

16 Claims, 1 Drawing Sheet

DESICCANT MATRIX FOR AN INSULATING GLASS UNIT

BACKGROUND OF THE INVENTION

I. Field of the Invention

This invention relates generally to methods and compositions for constructing insulating glass units and in particular, methods and compositions for making a desiccant matrix which is applied to a metal spacer assembly used in the construction of insulating glass units. Most specifically, the present invention relates to a powdered desiccant which is suspended in an atmospheric curing resin, the resin being in a liquid phase at room temperature.

II. Description of the Prior Art

Insulating glass units generally comprise a pair of glass sheets maintained in a spaced apart relationship to each other by a spacing and sealing assembly which extends around the periphery of the inner, facing surfaces of the glass sheets, to define a sealed and insulating air space between the glass sheets. A spacer assembly generally comprises an inner spacer-dehydrator element which extends around the periphery of the inside facing surfaces of the glass sheets. The inner surfaces of the glass sheets are attached to the outer surface of the spacer assembly by means of a sealant or adhesive.

In one typical form of insulating glass unit, the inner spacer-dehydrator element comprises a hollow metal spacer element generally adhered to the periphery of the inside, facing surfaces of the sheets, to provide an insulating air space. The metal spacer element is generally tubular in shape and filled with a desiccant material, which is put in communication with the insulating air space to absorb moisture therefrom, and to enhance the performance and durability of the unit. The desiccant prevents moisture condensation on the inner surfaces of the window panes.

There are several known ways of filling the spacer assembly with the desiccant material. One known way is to manually pour beads which serve as carriers for the desiccant in the spacer assembly. This method is unsatisfactory because it is both inefficient and labor intensive. Another approach to applying the desiccant material to the spacer assembly is to utilize a powdered molecular desiccant which is carried in a hot melt butyl thermoplastic carrier. There are numerous problems with this approach. Because the hot melt carrier must be maintained at an elevated temperature while the desiccant material is being applied to the spacer, this procedure requires elevated temperature application equipment, thereby increasing initial capital costs and operating costs. Additionally, since the desiccant impregnated spacers often times must be handled right after application of the desiccant material, the hot melt systems increase the likelihood that operators of the equipment as well as handlers of the spacers will get burned. Finally, the use of thermoplastic materials to carry the powdered desiccant may compromise the aesthetic integrity of the insulating glass unit in that even after installation, the desiccant carrier can remelt and/or sag if the window unit is exposed to elevated temperatures. This makes the use of thermoplastics as desiccant carriers highly undesirable for window units installed in locations having hot climates.

U.S. Pat. No. 4,622,249 discloses a silicone glazing adhesive/sealant as a desiccant carrier. The carrier material is a flexible, organic, room temperature vulcanizable adhesive sealant material comprised of two components. One of the components comprises a base material and the other component comprises a curing agent or accelerator. Neither of the components is individually curable or vulcanizable. When the two components are combined, a chemical cross linking reaction takes place which begins curing or vulcanizing the two-component material at room temperature.

U.S. Pat. No. 3,758,996 discloses a desiccant material which is carried in a thermoplastic carrier. In one example, the desiccant matrix is applied to the spacer assembly at a temperature above 250° F.

The present invention overcomes all of the problems of the prior art in that it provides a desiccant matrix for use in a spacer assembly of an insulating glass unit which can be applied as a single component and at room temperature. Upon exposure to the atmosphere, the desiccant matrix irreversibly cures into a solid structure, thereby preventing the desiccant from running or sagging at some later date after installation of the window unit. Since the desiccant matrix can be applied as a single component and at room temperature, operating costs are kept down, as well as minimizing the potential risk of injury to workers who must handle the spacer assemblies. These and other advantages of the present invention will be readily apparent from the description, the discussion and examples which follow.

SUMMARY OF THE INVENTION

There is disclosed herein a spacer assembly for use in a multiple pane window assembly comprising a powdered molecular sieve desiccant suspended in an atmospheric curing resin which is a liquid at room temperature. The composition of the desiccant matrix comprises, by weight, approximately 30 to 80% of a powdered molecular sieve desiccant, together with approximately 5 to 40% of an atmospheric curing resin.

In particular embodiments, the powdered molecular sieve desiccant has a pore size ranging from three angstroms to ten angstroms. The desiccant may comprise a mixture of different pore-sized material. One particularly preferred molecular sieve desiccant comprises a blend of 97% 3A and 3% 13X desiccants. The liquid carrier is preferably an atmospheric curing resin which exists in a liquid state at room temperature. One particularly preferred group of atmospheric curing resins comprises alkoxy silane terminated polyurethanes. Another preferred group of resins comprises alkoxy silane terminated polyethers. Finally, a third group of preferred resins comprises polydimethylsiloxanes. The composition may also include ancillary ingredients such as plasticizers, catalysts, and fillers. Some preferred plasticizers include phthalate esters, chlorinated paraffins, mineral oils, and silicon oils. The catalysts may include organotin compounds such as dibutyl tin dilaurate and dibutyl tin diacetate, as well as aliphatic titanates and amines. Small volume fillers may include colorants, rheological materials and/or pigments.

DETAILED DESCRIPTION OF THE INVENTION

Figure 1:
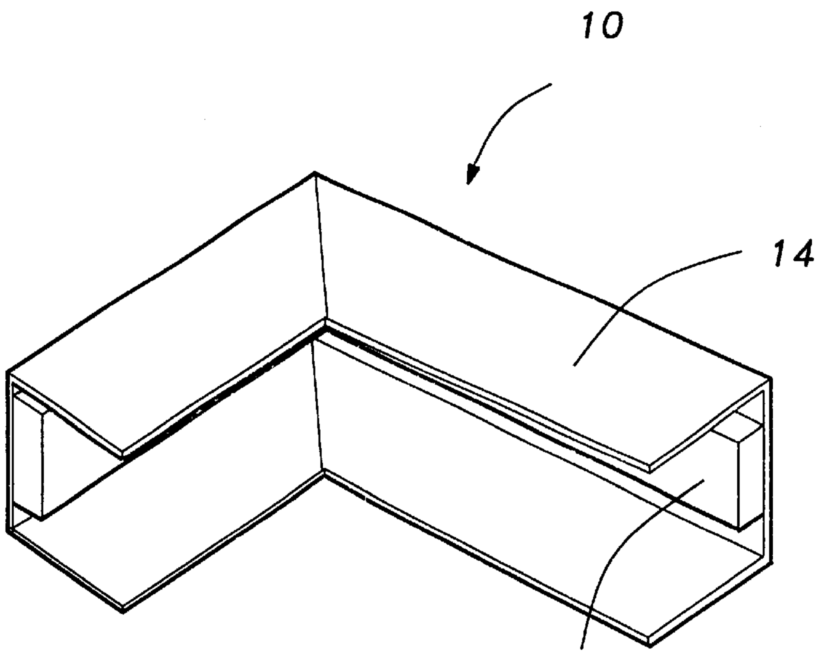
FIG. 1 is a perspective view of a spacer assembly.
Figure 2:
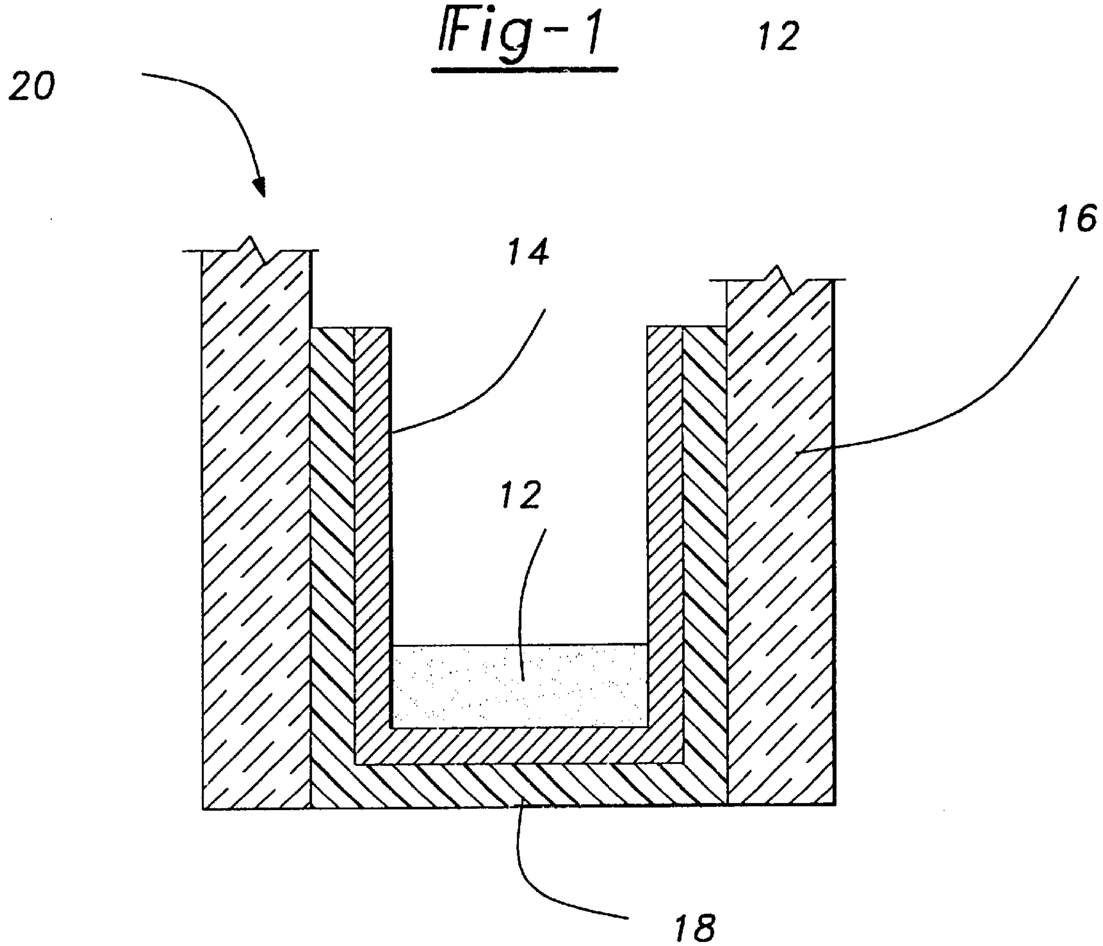
FIG. 2 is a cross-sectional view of a spacer assembly in an insulating glass unit.

Referring to FIGS. 1 and 2, the present invention is directed to a spacer assembly 10 for use in a multiple pane window unit, the interior of the spacer assembly 10 being filled with a desiccant matrix 12. The desiccant matrix 12 can be applied to the spacer 14 at room temperature, and upon exposure to moisture and/or oxygen is irreversibly cured.

In the broadest sense, the present invention includes a powdered molecular sieve desiccant which is dispersed in an atmospheric curing resin which exists as a liquid at room temperature. Within the context of this disclosure, atmospheric "curing resins" are meant to include monomeric and low molecular weight polymeric materials which cross-link and/or polymerize upon exposure to a component of the ambient atmosphere, typically oxygen or water vapor.

Preferably, the powdered molecular sieve desiccant is present in the desiccant matrix 12 in a concentration of 30 to 80% by weight, more preferably 40–70% by weight, and most preferably 60% by weight. The liquid carrier is typically present in the desiccant matrix 12 in a range of 5 to 40% by weight, more preferably 10–25% by weight, and most preferably 22.2% by weight. The carrier further comprises atmospheric curing resins which exist in a liquid phase at room temperature. The desiccant matrix 12 may also include a catalyst, a plasticizer, as well as small volume fillers.

The powdered molecular sieve desiccant is preferably one which has a pore size ranging from three to ten angstroms, and mixtures thereof. It may further comprise synthetic zeolite, sodium aluminum silicate, or potassium aluminum silicate. Among some of the more preferred desiccants are powdered molecular sieve 3A and powdered molecular sieve 13X, as are known in the art. One particularly preferred desiccant comprises a blend of 97% 3A and 3% 13X desiccants.

The carrier for the desiccant is an atmospheric curing resin which exists in the liquid phase at room temperature. A preferable group of carriers for the desiccant comprises moisture cure polyurethanes, moisture cure polysulfides, polydimethylsiloxanes, and oxygen cure polysulfides. Some specific carriers include alkoxy acetoxy oxyamino silane terminated polyethers and polyether urethanes; alkyl siloxane polymers crosslinked with alkoxy acetoxy oxyamino organo functional silanes; moisture curable isocyanate functional poly oxyalkaline polymers and polyalkaline polymers; thiol functional polymers and oligomers (such as polyethers, polyether urethanes, polysulfides, polythioethers), suitably catalyzed to produce moisture curable systems; epoxide functional polymers and oligomers with moisture deblockable crosslinkers; and acrylic function polymers with deblockable crosslinkers. Most preferably, the carrier comprises alkoxy silane terminated polyurethanes, alkoxy silane terminated polyethers, or polydimethylsiloxane polymers. In one preferred formulation, the carrier comprises Kaneka MS, manufactured by KaneKagafuchi Chemical Company of Japan and distributed by Union Carbide. In a most preferred formulation, the carrier comprises Permapol MS, manufactured by Courtaulds Coatings, Inc.

The specific organic catalyst used in the present invention will depend upon the particular carrier which is used. Preferable catalysts comprise organotin compounds, aliphatic titanates (having from one to twelve carbon atoms) such as lower alkyl *titanates, and amines. Most preferably the catalyst comprises dibutyl tin dilaurate, dibutyl tin diacetate, tetrabutyl titanate, and tetraethyl titanate.

The selection of the plasticizer is also dependent upon the nature of the liquid resin. The most preferable plasticizers are phthalate esters, chlorinated paraffins, mineral oils, and silicone oils. The selection of the plasticizer depends upon compatibility with the liquid resin, low cost, as well as having low volatility and low vapor pressure. A plasticizer having high volatility or high vapor pressure would be undesirable because it would fog the interior of the insulating glass unit. In a preferred formulation, the plasticizer comprises 0–30% by weight of the desiccant matrix 12, more preferably 5–20% by weight, and most preferably 13.4% by weight.

Although the material will still cure without the addition of the catalyst, the addition of a catalyst provides for very rapid skin times, as well as faster curing times, which may be necessary in certain situations. It may also be desirable, in some instances, to add small amounts of fillers, colorants, pigments, rheological agents and the like.

The desiccant matrix 12 of the present invention may be prepared in the following manner. Preferably, the plasticizer is first disposed in a mixing vessel. In one preferred embodiment, the mixing vessel comprises a variable speed, multishaft unit, having a low speed sweep blade, a high speed disperser, and a low speed auger. The mixing vessel further comprises a 300 gallon, triple shaft vacuum mixer with cooling capabilities. The liquid polymer is then added to the plasticizer and mixing begins at low speed. Thereafter, the powdered molecular sieve desiccant is added to the mixture and the high speed disperser is activated to decrease the average particle size of the mixture as well as to increase uniformity within the mixture. At the point the desiccant is added, the mixing is conducted under vacuum so as to eliminate any exposure of the mixture to moisture. The fillers, colorants and the like, as well as the catalyst, are added last. The material is maintained under essentially dry conditions until such time as it is ready to be applied to the spacer assembly 10.

The desiccant matrix 12 is applied to the interior of the spacer assembly 10 at room temperature. The application can be made by any conventional dispensing technique such as extruding, pumping, or the like. Upon exposure to the atmosphere, the desiccant matrix 12 irreversibly cures. Upon installation, the spacer assembly 10 is disposed between a plurality of glass sheets 16. The spacer assembly 10 is adhered to the glass sheets 16 by means of a conventional sealant 18, as is known in the art. The final curing of the desiccant matrix 12 generally takes place once the entire insulating glass unit 20 is installed.

The present invention will best be illustrated by the following series of examples:

EXAMPLE 1

All weights are in pounds, unless otherwise indicated.

Step 1. Material: Phthalate ester plasticizer; Charge Weight: 762.5; % Weight: 22.66; Procedure: Charge. Mix under full vacuum at low speed for 10 minutes.

Step 2. Material: Permapol MS polymer 1; Charge Weight: 225; % Weight: 6.7; Procedure: Charge.

Step 3. Material: Permapol MS polymer 2; Charge Weight: 225; % Weight: 6.7; Procedure: Charge. Turn on cooling water.

Step 4. Material: Organic treated clay; Charge Weight: 41; % Weight: 1.2; Procedure: Charge.

Step 5. Material: Carbon black; Charge Weight: 20; % Weight: 0.6; Procedure: Charge. Mix at low speed for 5 minutes.

Step 6. Material: Titanium dioxide; Charge Weight: 4086 gms; % Weight: 0.3; Procedure: Charge.

Step 7. Material: Powdered molecular sieve 13X; Charge Weight: 155; % Weight: 4.6; Procedure: Charge.

Step 8. Material: Ground calcium carbonate; Charge Weight: 45; % Weight: 1.34; Procedure: Charge. Turn on vacuum. Mix with low speed blades at low setting and disperser at medium speed for 5 minutes.

Step 9. Material: Powdered molecular sieve 3A; Charge Weight: 1850; % Weight: 55; Procedure: Charge. Turn on vacuum, then close vacuum. Mix at low speed all blades for 5 minutes.

Step 10. Material: Fumed silica; Charge Weight: 15; % Weight: 0.4; Procedure: Charge. Turn on vacuum. Then close vacuum. Mix at medium speed all blades for 10 minutes.

Step 11. Material: Dibutyl tin dilaurate; Charge Weight: 715 g; % Weight: 0.05; Procedure: Charge.

EXAMPLE 2

All weights are in pounds, unless otherwise indicated.

Step 1. Material: Phthalate ester plasticizer; Charge Weight: 762.5% Weight: 22.66; Procedure: Charge. Mix under full vacuum at low speed for 10 minutes.

Step 2. Material: Permapol MS polymer 1; Charge Weight 225; % Weight: 6.7; Procedure: Charge.

Step 3. Material: Permapol MS polymer 2; Charge Weight: 225; % Weight: 6.7; Procedure: Charge. Turn on cooling water.

Step 4. Material: Organic treated clay; Charge Weight: 41; % Weight: 1.2; Procedure: Charge.

Step 5. Material: Carbon Black; Charge Weight: 3065 g; % Weight: 0.2; Procedure: Charge. Mix at low speed for 5 minutes.

Step 6. Material: Powdered molecular sieve 13X; Charge Weight: 155; % Weight: 4.6; Procedure: Charge.

Step 7. Material: Ground calcium carbonate; Charge Weight: 45; % Weight: 1.34; Procedure: Charge. Turn on vacuum. Mix with low speed blades at low setting and disperser at medium speed for 5 minutes.

Step 8. Material: Powdered molecular sieve 3A; Charge Weight: 1850; % Weight: 55; Procedure: Charge. Turn on vacuum, then close vacuum. Mix at low speed all blades for 5 minutes.

Step 9. Material: Fumed silica; Charge Weight: 15; % Weight: 0.4; Procedure: Charge. Turn on vacuum. Then close vacuum. Mix at medium speed all blades for 10 minutes.

Step 10. Material: Dibutyl tin dilaurate; Charge Weight: 715 g; % Weight: 0.05; Procedure: Charge.

EXAMPLE 3

The same protocol was used as set forth in Examples 1 and 2.

| Material | Weight (grams) | % Weight |
|---|---|---|
| Phthalate ester plasticizer | 162.51 | 22.0% |
| Kaneka 20A | 100 | 13.6% |
| Organic treated clay | 10 | 1.4% |
| Carbon black | 0.01 | 0.001% |
| Titanium dioxide | 2.0 | 0.3% |
| Powdered molecular sieve 13× | 34.6 | 4.7% |
| Ground calcium carbonate | 17.9 | 2.4% |
| Powdered molecular sieve 3A | 409 | 55.3% |
| Fumed silica | 3.4 | 0.5% |
| Dibutyl tin dilaurate | 0.5 | 0.1% |
| | 740.02 | 100% |

EXAMPLE 4

The same protocol was used as set forth in Examples 1 and 2.

| Material | Weight (grams) | % Weight |
|---|---|---|
| 18000 Centistoke silicone polymer | 50 | 20.8% |
| 50 Centistoke non-reactive silicone fluid | 52.0 | 21.6% |
| Powdered molecular sieve 3A | 125 | 51.9% |
| Dibutyl tin dilaurate | 0.5 | 0.2% |
| Powdered molecular sieve 13× | 13.0 | 5.4% |
| Carbon black | 0.2 | 0.08% |
| | 240.7 | 99.98% |

The foregoing discussion and examples are merely meant to illustrate particular embodiments of the invention, and are not meant to be limitations on the practice thereof. It is the following claims, including all equivalents, which define the scope of the invention.

What is claimed is:

1. In an insulating glass unit wherein a first glazing pane is maintained in a spaced apart relation with a second glazing pane by a spacer so as to define an interior volume therebetween, the improvement comprising:

a desiccant matrix disposed on said spacer and in communication with said interior volume, said desiccant matrix comprising:

a powdered molecular sieve desiccant; and a carrier for said powdered molecular sieve desiccant, said carrier comprising an atmospheric curing resin which partially cures upon exposure to a component of an ambient atmosphere selected from a group consisting of moisture and oxygen, during assembly of said insulating glass unit said resin fully curing after assembly of said glass unit.

2. The desiccant matrix of claim 1, wherein said powdered molecular sieve desiccant comprises approximately 40–70% by weight of said desiccant matrix.

3. The desiccant matrix of claim 2, wherein said powdered molecular sieve desiccant comprises approximately 60% by weight of said desiccant matrix.

4. The desiccant matrix of claim 1, wherein said resin comprises approximately 10–25% by weight of said desiccant matrix.

5. The desiccant matrix of claim 4, wherein said resin comprises approximately 22% by weight of said desiccant matrix.

6. The desiccant matrix of claim 1, wherein said matrix further comprises a plasticizer.

7. The plasticizer of claim 6, wherein said plasticizer comprises approximately 0–30% by weight of said desiccant matrix.

8. The plasticizer of claim 7, wherein said plasticizer comprises approximately 5–20% by weight of said desiccant matrix.

9. The plasticizer of claim 8, wherein said plasticizer comprises approximately 13% by weight of said desiccant matrix.

10. The desiccant matrix of claim 6, wherein said plasticizer comprises a low volatility, low vapor pressure plasticizer selected from the group consisting of phthalate esters, chlorinated paraffins, silicon oils, and mineral oils.

11. The desiccant matrix of claim 1, wherein said powdered molecular sieve desiccant comprises approximately 30–80% by weight of said desiccant matrix.

12. In an insulating glass unit wherein a first glazing pane is maintained in a spaced apart relation with a second glazing pane by a spacer so as to define an interior volume therebetween, the improvement comprising:

a desiccant matrix disposed on said spacer and in communication with said interior volume, said desiccant matrix comprising:

a powdered molecular sieve desiccant, wherein said powdered molecular sieve desiccant comprises a desiccant selected from the group consisting of synthetic zeolite, sodium aluminum silicate, potassium aluminate silicate and mixtures thereof; and a carrier for said powdered molecular sieve desiccant, said carrier comprising an atmospheric curing resin which partially cures upon exposure to a component of an ambient atmosphere selected from a group consisting of moisture and oxygen, said resin fully curing after assembly of said glass unit, said resin fully curing after assembly of said glass unit, wherein said resin is selected from the group of resins consisting of moisture curing urethanes, moisture curing polysulfides, oxygen curing polysulfides and mixtures thereof.

13. The desiccant matrix of claim 12, wherein said powdered molecular sieve desiccant comprises a blend of 3A and 13X desiccants.

14. The desiccant matrix of claim 12, wherein said moisture curing urethane comprises an alkoxy silane terminated polyurethane.

15. The desiccant matrix of claim 12, wherein said resin comprises an alkoxy silane terminated polyether.

16. The desiccant matrix of claim 12, wherein said resin comprises a polydimethylsiloxane resin.

* * * * *